United States Patent [19]

Shavit

[11] 4,421,271

[45] Dec. 20, 1983

[54] ZERO ENERGY BAND SUBBASE FOR PNEUMATIC THERMOSTATS

[75] Inventor: Gideon Shavit, Highland Park, Ill.

[73] Assignee: Honeywell Inc., Minneapolis, Minn.

[21] Appl. No.: 20,692

[22] Filed: Mar. 15, 1979

[51] Int. Cl.³ .............................................. G05D 23/02
[52] U.S. Cl. ...................................... 236/82; 236/87; 137/84
[58] Field of Search ............................ 236/1 C, 87, 82; 165/26; 137/82, 84

[56] References Cited

U.S. PATENT DOCUMENTS

| Re. 28,676 | 1/1976  | Edelman et al. | 236/1 C   |
|------------|---------|----------------|-----------|
| 2,278,016  | 3/1942  | Otto           | 236/1 C X |
| 2,871,869  | 2/1959  | Howard         | 137/82    |
| 3,084,675  | 4/1963  | Scheidler      | 137/82 X  |
| 3,115,147  | 12/1963 | Mueller        | 137/116.5 |
| 3,605,781  | 9/1971  | Juesting       | 137/82    |
| 3,971,396  | 7/1976  | Bentsen        | 137/82    |
| 4,177,860  | 12/1979 | Johnson et al. | 236/1 C X |

Primary Examiner—William E. Tapolcai
Attorney, Agent, or Firm—Trevor B. Joike

[57] ABSTRACT

A pneumatic subbase for modifying the operation of a pneumatic thermostat is disclosed having a first nozzle to be connected to a source of main pressure, a second nozzle for supplying branch output pressure to the device being controlled, a third nozzle connected through the subbase to the first nozzle for supplying main pressure to a thermostat and a fourth nozzle connected to receive the output from the thermostat, the subbase having a dwell relay therein for providing a dwell in the branch output pressure of the second nozzle as a function of the pressure received from the thermostat at the fourth nozzle.

6 Claims, 22 Drawing Figures

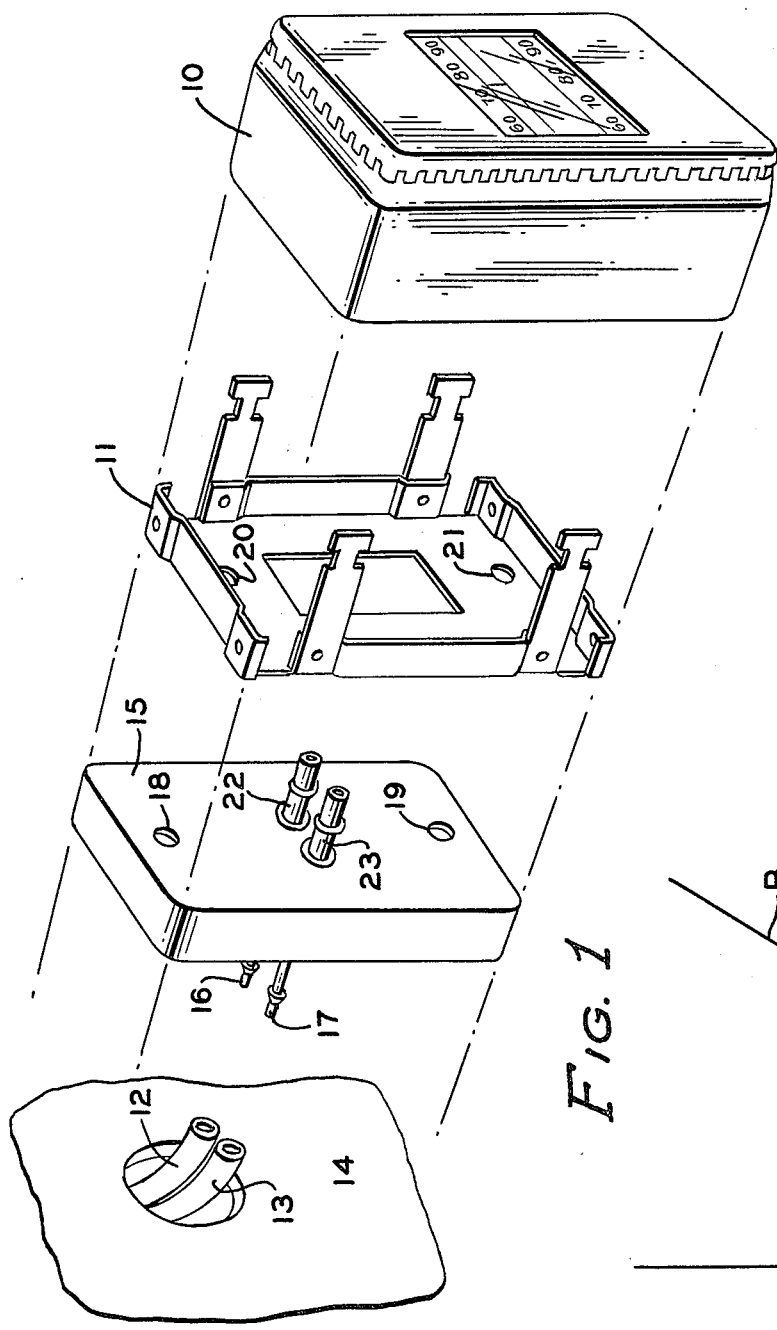

ZERO ENERGY BAND SUBBASE FOR PNEUMATIC THERMOSTATS

BACKGROUND OF THE INVENTION

This invention relates to subbases for retrofitting existing pneumatic thermostats and, more particularly, to subbases for providing an adjustable deadband during which the air conditioning plant of a building provides neither heating nor cooling.

Energy conservation requirements have given rise to new standards in room temperature control. For example, 68° F. in winter and 78° F. in summer, rather than a constant year around 75° F., have become the new acceptable control points. With these new control points, the air conditioning equipment which provides both heating and cooling for a building is not controlled in the band between the two control points. Thus, a considerable amount of energy can be saved. In essence, this system provides a fairly large temperature range wherein neither heating nor cooling is being used and the room temperature is allowed to wander within this "deadband" with no control whatsoever.

There are several ways in which such a control function can be obtained. A second thermostat can be added such that the first is controlled around one temperature and the second is controlled around the other temperature to provide the desired deadband. Alternatively, the springs on the heating and cooling actuators can be changed so that these actuators will not be operative to control their respective heating and cooling equipment while the temperature is in this deadband. A still further alternative is to take out the old thermostat and substitute an entirely new thermostat which is capable of providing this deadband function. All of these approaches, however, are expensive not only from the standpoint of the equipment which must be substituted or added to the existing air conditioning plant but also in terms of the amount of field labor required to modify these existing systems.

The present invention minimizes the expense of converting existing air conditioning plants into ones where the temperature is allowed to float within a zero energy band, or deadband, by providing a subbase which modifies the output of the thermostat to provide the desired control. Thus, the subbase divides the thermostat output into three sections—one for heating, one for cooling, and one in which temperature changes result in neither heating nor cooling. When using this subbase, the installer need only disconnect the existing thermostat from the pneumatic tubes in the wall supporting the thermostat, connect the tubes to one pair of nozzles on one side of the subbase, and reconnect the thermostat to a second pair of nozzles on the other side of the subbase.

SUMMARY OF THE INVENTION

A pneumatic subbase for modifying the operation of a pneumatic thermostat is provided having a first nozzle for connection to a source of main pressure, a second nozzle for supplying branch output pressure to the controlled apparatus, a third nozzle for supplying main pressure to the thermostat, a fourth nozzle for receiving thermostat output pressure, and a dwell relay for providing a dwell period in the branch output pressure as a function of the thermostat output pressure.

BRIEF DESCRIPTION OF THE DRAWINGS

These and other features and advantages will become apparent from a detailed consideration of the invention when taken in conjunction with the drawings in which:

FIG. 1 shows the way in which the subbase is inserted between the thermostat and its wall connections;

FIG. 2 shows the response curve for the dwell relay, or zero energy band relay, of the subbase;

FIG. 3 shows a circuit schematic of the dwell relay;

DETAILED DESCRIPTION

Figure 4:
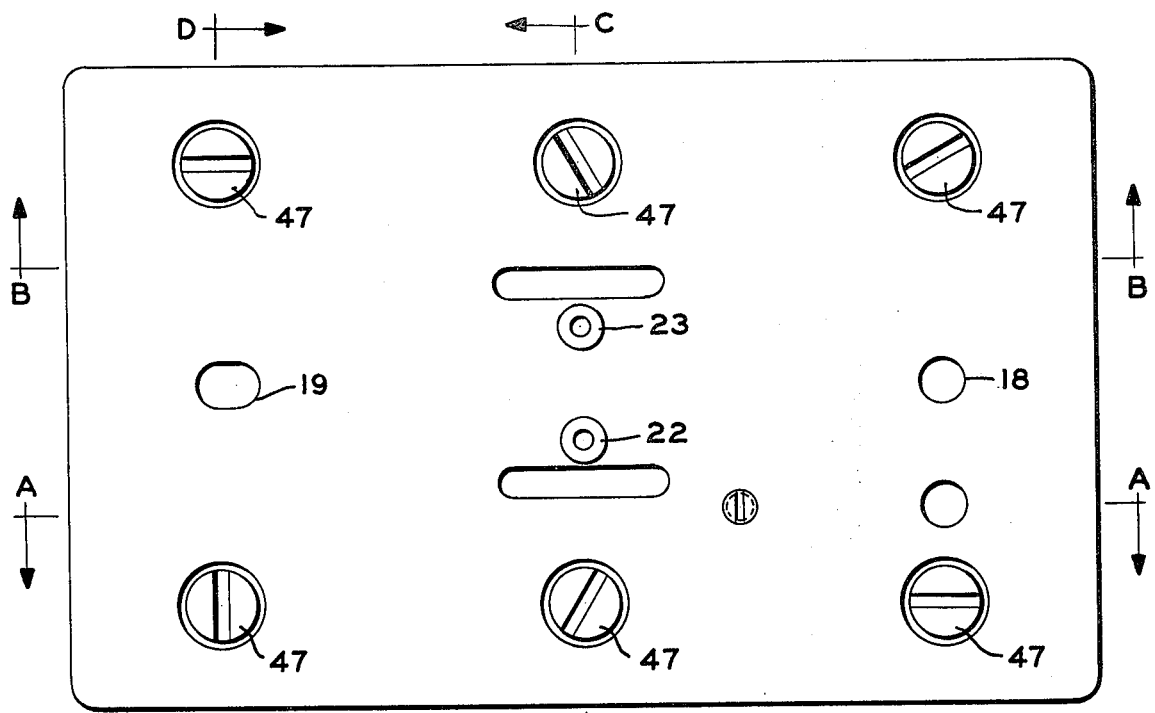
FIG. 4 is a top view of the subbase.

In FIG. 1, when the subbase is to be used in accordance with the instant invention thermostat 10 and its mounting backplate 11 are disconnected from nozzles 12 and 13 extending through wall 14. Nozzle 12 supplies main line pressure and nozzle 13 returns branch output pressure to the air conditioning plant for the control thereof. When subbase 15 is to be installed, its nozzle 16 is inserted into tube 12 and its nozzle 17 is inserted into tube 13. Mounting backplate 11 is then inserted over the face of subbase 15 so that holes 18 and 19 of subbase 15 align with holes 20 and 21 respectively of mounting backplate 11. Suitable fastening means, such as screws, are then inserted through the overlying holes for attaching the unit to wall 14. Thermostat 10 then may be attached to subbase 15 by inserting its pair of nozzles into the corresponding pair of nozzles 22 and 23 of subbase 15. Nozzle 22 supplies main line pressure to thermostat 10 and nozzle 23 receives the thermostat output pressure. Thermostat 10 and mounting backplate 11 may be, for example, the TP970 pneumatic thermostat manufactured by Honeywell, Inc. Subbase 15 has been designed to mate specifically with the Honeywell TP970 but, as is quite clear, it may be modified to be used with any pneumatic thermostat.

Subbase 15 is designed to provide the type of output response curve shown in FIG. 2. This curve shows the output pressure Po in nozzle 17 as a function of the temperature sensed by thermostat 10. The output curve comprises a segment A which is used for heating control, segment B which is used for cooling control and segment C which is the zero energy band or dwell or deadband of subbase 15. As will become clear hereinafter, segment C is adjustable to provide any desired dwell.

Subbase 15 is shown schematically in FIG. 3. It comprises four basic elements—first diaphragm module unit 1, second diaphragm module unit 2, third diaphragm module unit 3, and combination restriction-filter 4. Nozzle 16 of subbase 15 is shown connected to pneumatic line 12, nozzle 17 is shown connected to pneumatic line 13, nozzle 22 is shown for supplying main line pressure to thermostat 10 and nozzle 23 is shown connecting the thermostat output pressure to subbase 15. Supply pressure is brought in by nozzle 16 and is filtered and restricted by filter-restriction 4 and is then connected to flow chambers 30 and 31 of respective diaphragm units 1 and 2 and also to output nozzle 17 which supplies branch output pressure to pneumatic line 13. Diaphragm module unit 1 has control chamber 33 connected to nozzle 23, diaphragm 36 separating control chamber 33 from flow chamber 30, spring 39 located within flow chamber 30 for providing a bias force to diaphragm 36, and nozzle 42 for cooperating with diaphragm 36 and connected to atmosphere. Diaphragm module unit 2 has control chamber 34 connected to atmosphere and having spring 40 therein for applying a bias force to diaphragm 37 which separates control chamber 34 from flow chamber 31. Nozzles 43 cooperates with diaphragm 37 and is connected to flow chamber 32 of diaphragm module unit 3. Control chamber 35 of this unit is connected to nozzle 23 for receiving thermostat output pressure and controls the position of diaphragm 38 with respect to nozzle 44 for controlling the pressure within flow chamber 32. Nozzle 44 is connected to atmosphere. Spring 41 within flow chamber 32 applies a bias force to diaphragm 38.

In operation, with the output of thermostat 10 at its lowest point, spring 39 biases diaphragm 36 away from nozzle 42 so that output nozzle 17 is connected through flow chamber 30 and nozzle 42 to atmosphere. Thus, the branch output pressure in nozzle 17 is zero. As the temperature sensed by thermostat 10 increases, its output pressure at nozzle 23 also increases to begin closing off diaphragm 36 against nozzle 42 which begins increasing the pressure within flow chamber 32 to correspondingly increase the branch output pressure at nozzle 17. Knee D of FIG. 2 is selected by the spring 40 in diaphragm module 2. As the temperature sensed by thermostat 10 reaches this knee, diaphragm 37 lifts off of nozzle 43 and diaphragm unit 2 now regulates the output pressure holding it to the pressure at the knee by siphoning off any excess pressure through nozzle 43 and flow chamber 41 to atmosphere. Spring 41 in diaphragm module unit 3 selects the temperature and thus the pressure at nozzle 23, where diaphragm 38 begins at knee E to assume control. Once this knee is reached, diaphragm 38 begins closing against nozzle 44 for allowing the branch output pressure in nozzle 17 to increase along curve B of FIG. 2.

Figure 7:
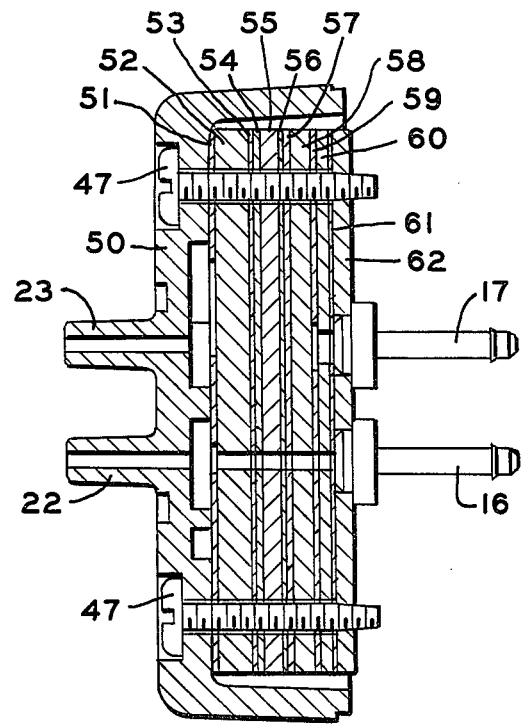
FIG. 7 is a cross sectional view of the subbase taken along lines 7—7 of FIG. 4.

The remaining Figures of the drawing show the details of the construction of the subbase. FIG. 4 is a top view of the subbase and shows nozzles 22 and 23 for connection to thermostat 10. Also shown in FIG. 4 are six screws 47 for holding the sandwich construction together. These screws, as shown in FIG. 7, extend through all of the layers of the subbase and through suitable threads in the bottom plate for holding the construction together. These holes will not be hereinafter discussed. Also shown are the holes 18 and 19 for cooperating with the holes 20 and 21 of mounting backplate 11 to allow the installing of subbase 15 and mounting backplate 11 to the wall.

Figure 5:
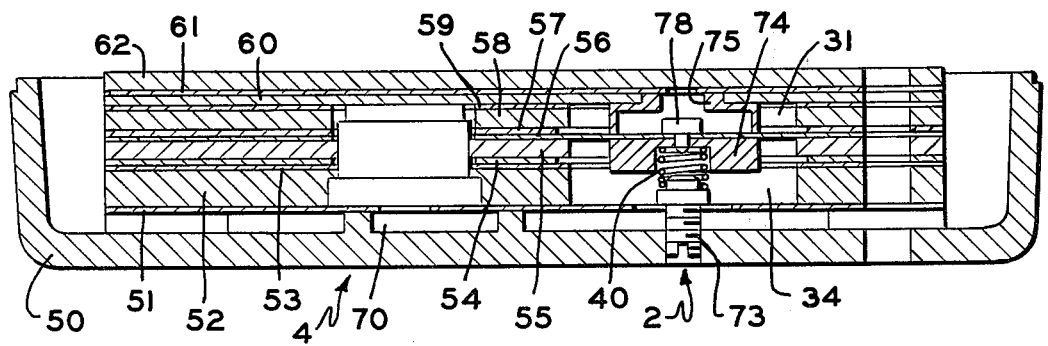
FIG. 5 is a cross sectional view of the subbase taken along lines 5—5 of FIG. 4.
Figure 6:
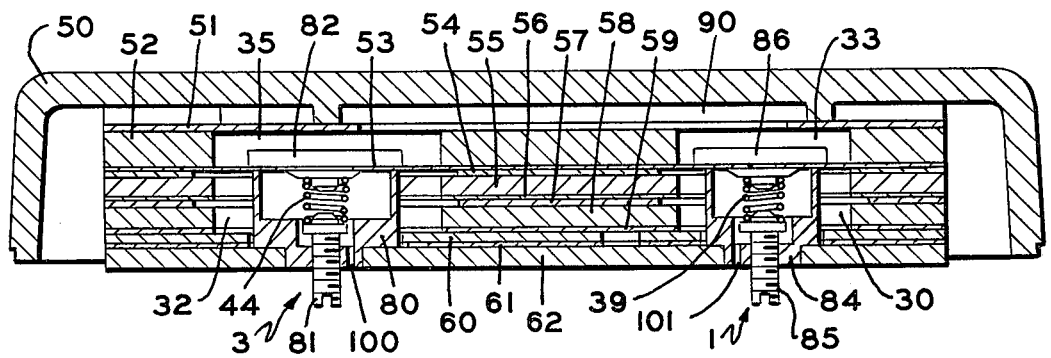
FIG. 6 is a cross sectional view of the subbase taken along lines 6—6 of FIG. 4.
Figure 8:
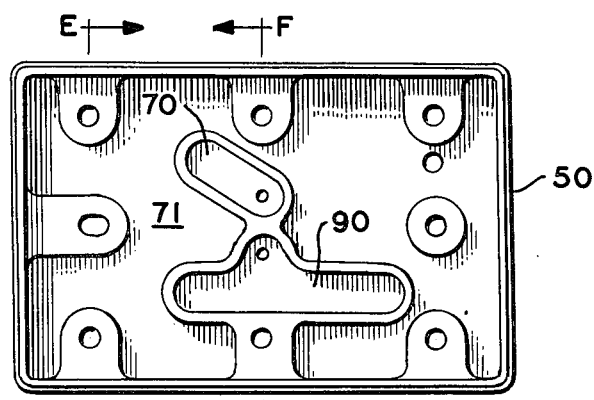
FIG. 8 is a bottom view of the stand off ring shown in FIGS. 4-7.
Figure 9:
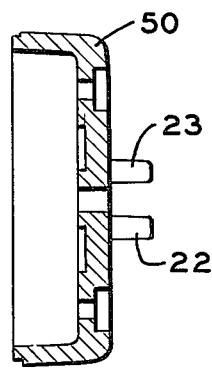
FIG. 9 is a cross sectional view of only the stand off ring taken along lines 9—9 of FIG. 8.
Figure 10:
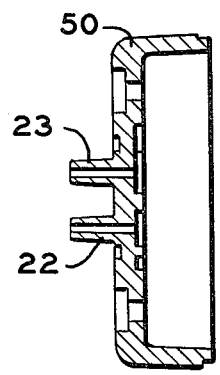
FIG. 10 is a cross sectional view of only the stand off ring taken along lines 10—10 of FIG. 8; and, FIGS. 11-22 show the various elements of the sandwich construction for the device shown in FIGS. 4-7.
Figure 11:
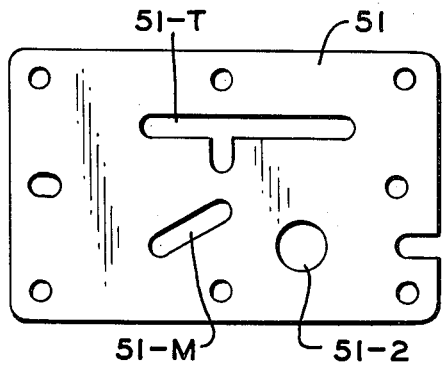
Figure 12:
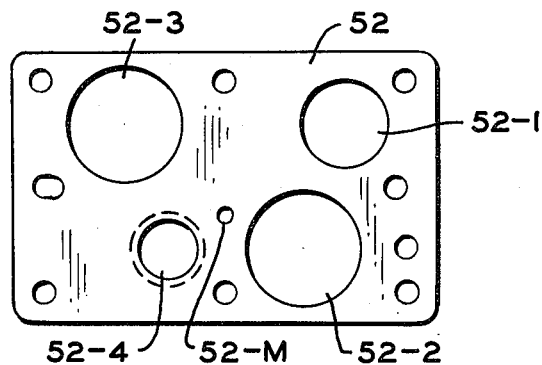
Figure 13:
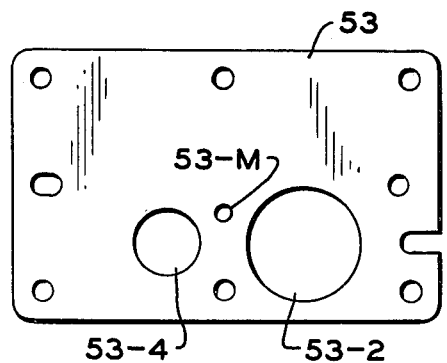
Figure 14:
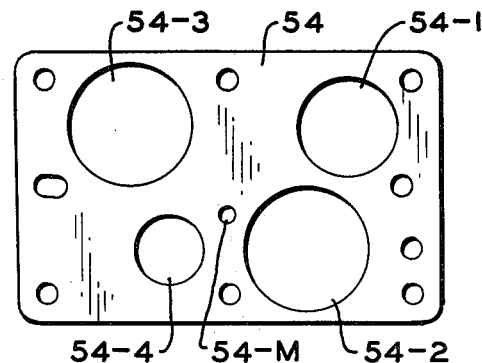
Figure 15:
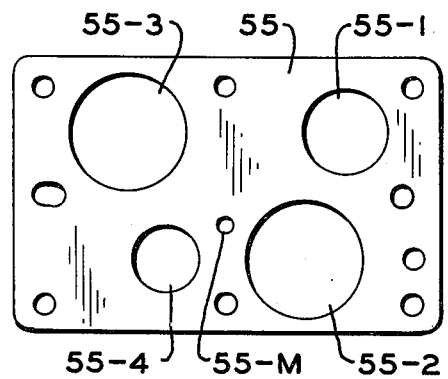
Figure 16:
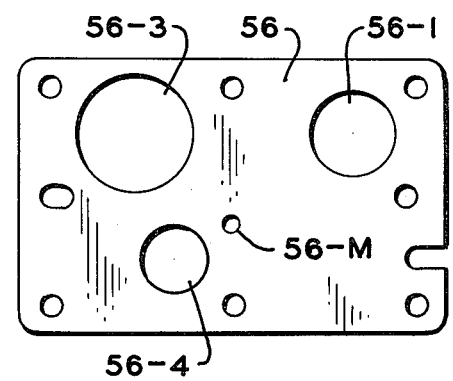
Figure 17:
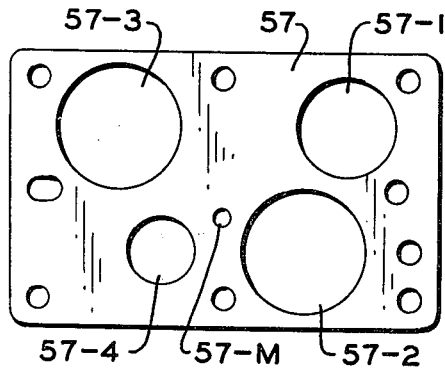
Figure 18:
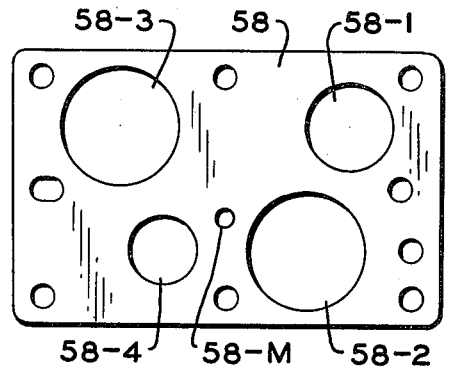
Figure 19:
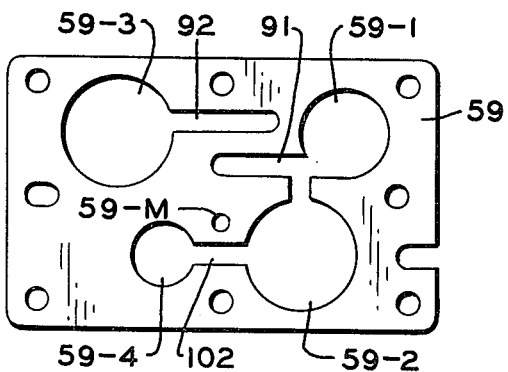
Figure 20:
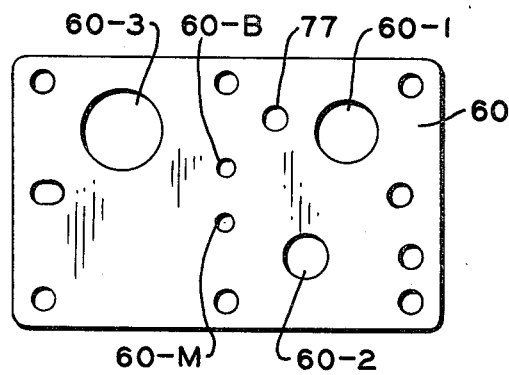
Figure 21:
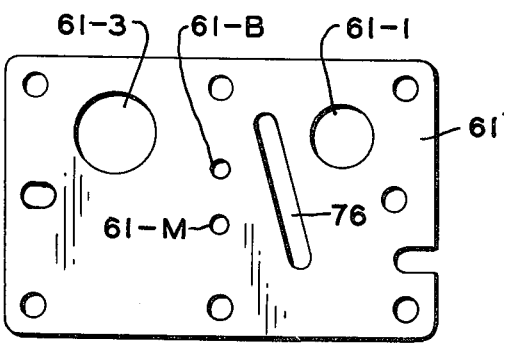
Figure 22:
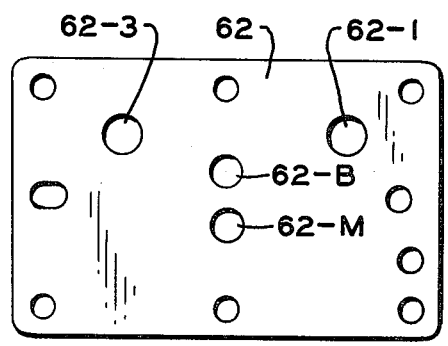

As shown in FIGS. 5, 6 and 7, the subbase assembly comprises stand off ring 50 which is shown in more detail in FIGS. 8-10, gasket 51 shown in FIG. 11, plate 52 shown in FIG. 12, diaphragm 53 shown in FIG. 13, gasket 54 shown in FIG. 14, plate 55 shown in FIG. 15, diaphragm 56 shown in FIG. 16, gasket 57 shown in FIG. 17, plate 58 shown in FIG. 18, gasket 59 shown in FIG. 19, plate 60 shown in FIG. 20, gasket 61 shown in FIG. 21, and bottom plate 62 shown in FIG. 22. When the reference numerals 51-62 shown in respective FIGS. 11-22 are followed by a 1, this 1 designates that the hole so referenced in the associated part corresponds to the diaphragm module unit 1 shown in FIG. 3. Likewise, the numbers 2, 3 and 4 are used to show the holes for the other associated elements in FIG. 3. The letter M is used to show the flow of main pressure through the subbase and the letter B is used to show how the branch output pressure is derived.

Thus, filter-restriction 4 is inserted through hole 52-4 in plate 52, 53-4 in diaphragm 53, 54-4 in gasket 54, 55-4 in plate 55, 56-4 in gasket 56, 57-4 in gasket 57, 58-4 in plate 58 and 59-4 in gasket 59. Filter-restriction 4 receives main pressure from slot 51-M in gasket 51 and valley 70 in the rear surface of stand off ring 50 to which is connected nozzle 22 for supplying main pressure to thermostat 10.

The other side of filter-restriction 4 is connected to the branch output pressure nozzle 17 by hole 59-4, slot 102 and hole 59-2 in gasket 59 of FIG. 19 and from there through slot 91, hole 60-B in plate 60, hole 61-B in plate 61 and hole 62-B in plate 62 to nozzle 17 connected thereto.

Diaphragm module 2 has control chamber 34 formed by holes 55-2 in plate 55, 54-2 in gasket 54, 53-2 in diaphragm 53, 52-2 in plate 52, and 51-2 in gasket 51 and is then connected to atmosphere through the continuous valley 71 as shown in FIG. 8. Located within control chamber 34 is an adjustment screw 73, spring 40 and diaphragm pad 74. Spring 40, adjustment screw 73 and diaphragm pad 74 provide an adjustable bias against the diaphragm formed by diaphragm 56. Diaphragm 56 separates control chamber 34 from flow chamber 31 formed by holes 57-2 in gasket 57, 58-2 in plate 58, and 59-2 in gasket 59. Within flow chamber 31 is a cylindrical nozzle 75 which rests against plate 60 and extends through hole 60-2 therein for communicating the pressure within cylindrical nozzle 75 to slot 76 in gasket 61 for connecting this pressure through hole 77 in plate 60 to hole 59-3 and its associated slot 92 in gasket 59 to diaphragm module unit 3. Diaphragm pad 74 may be attached to diaphragm 56 by pin 78, the corresponding hole for which through diaphragm 56 is not shown.

Diaphragm module unit 3 has control chamber 35 formed by corresponding hole 52-3 in plate 52. Control chamber 35 is separated from flow chamber 32 by diaphragm 53. Flow chamber 32 is formed by corresponding holes 54-3 in gasket 54, 55-3 plate 55, 56-3 in diaphragm 56, 57-3 in gasket 57, 58-3 in plate 58, 59-3 in gasket 59, 60-3 in plate 60 and 61-3 in gasket 61. Cylindrical nozzle 80 cooperates with diaphragm 53 and extends through hole 62-3 in bottom plate 62. An adjustment screw 81 extending through nozzle 80 cooperates with spring 44 for providing an adjustable force to diaphragm 53. The spring rests against diaphragm pad 82 which may be of a two-part construction extending through a hole in diaphragm 53 not shown. Nozzle 80 is connected to atmosphere through hole 100 extending therethrough.

Diaphragm module unit 1 has control chamber 33 separated from flow chamber 30 by diaphragm 53. Control chamber 33 is formed by hole 52-1 in plate 52. Flow chamber 30 is formed by holes 54-1 in gasket 54, 55-1 in plate 55, 56-1 in diaphragm 56, 57-1 in gasket 57, 58-1 in plate 58, 59-1 in gasket 59, 60-1 in plate 60 and 61-1 in gasket 61. Located within flow chamber 30 is a cylindrical nozzle 84 for cooperating with diaphragm 53 and having an adjustment screw 85 extending therethrough for adjusting spring 39 to apply an adjustable force against diaphragm 53. Spring 39 rests against diaphragm pad 86. Nozzle 84 is connected to atmosphere by hole 101 extending therethrough.

Main pressure is supplied by pneumatic tube 12 to nozzle 16. This main pressure is supplied through the holes M in layers 51-62 to slot 51-M in gasket 51 and valley 70 in the rear surface of stand off ring 50. From there, main pressure is supplied both through nozzle 22 to thermostat 10 and to filter-restriction 4. The output from thermostat 10 is then connected through nozzle 23 to valley 90 in the rear surface of stand off ring 50 and the corresponding slot 51-T in gasket 51. The pressure within valley 90 and slot 51-T, as shown in FIG. 6, is connected to control chambers 33 and 35 of diaphragm module units 1 and 3. This thermostat output pressure in control chamber 33 is used to control the position of diaphragm 53 against cylindrical nozzle 84 which forms the nozzle 42 of diaphragm module unit 1. Likewise, the thermostat output pressure in control chamber 35 controls the position of diaphragm 53 with respect to cylindrical nozzle 80 which forms the nozzle 44 of diaphragm module unit 3. Branch output pressure is taken at nozzle 17 which is connected to the controlled apparatus by pneumatic tube 13 and is also connected to flow chambers 30 and 31 of diaphragm module units 1 and 2 through holes 62-B in plate 62, 61-B in gasket 61, 60-B in plate 60 and the slot 91 in gasket 59 for connection to the corresponding holes that form flow chambers 30 and 31. Cylindrical nozzle 75 of diaphragm module unit 2 is connected through slot 76 in gasket 61, hole 77 in plate 60 and slot 92 in gasket 59 to the corresponding holes that form the flow chamber of diaphragm module unit 3. Thus, the device shown in FIGS. 4-22 is the exact equivalent of the apparatus 15 shown in FIG. 3 and will perform according to the above described operation.

The embodiments of the invention in which an exclusive property or right is claimed are defined as follows:

1. A pneumatic subbase for modifying the operation of a pneumatic thermostat, said subbase comprising:
    first connecting means having a first nozzle adapted to be connected to a source of main pressure and a second nozzle adapted to supply a branch output pressure to a controlled apparatus;
    second connecting means comprising a third nozzle adapted to connect the main pressure from said first nozzle to a pneumatic thermostat and a fourth nozzle adapted to receive output pressure from said thermostat; and,
    dwell relay means for connecting directly said first nozzle to said third nozzle and connected to said second and fourth nozzles for providing a dwell period in the branch output pressure of said second nozzle as a function of the output pressure received by said fourth nozzle from said pneumatic thermostat, said dwell relay means comprising first, second and third diaphragm module units and a restriction.

2. The subbase of claim 1 wherein each of said diaphragm module units comprises a control chamber and a flow chamber separated by a diaphragm, a nozzle within said flow chamber for cooperation with said diaphragm, and a spring.

3. The subbase of claim 2 wherein said first diaphragm module unit has its control chamber connected to said fourth nozzle, its flow chamber connected to said second nozzle, its nozzle connected to atmosphere and its spring located within its flow chamber for applying a bias force to said diaphragm against the output pressure from said thermostat.

4. The subbase of claim 3 wherein said second diaphragm module unit has its control chamber connected to atmosphere, its flow chamber connected to said second nozzle, its nozzle connected to the flow chamber of said third diaphragm module unit, and its spring located within its control chamber for applying a bias force to its diaphragm against the branch output pressure within its flow chamber.

5. The subbase of claim 4 wherein said third diaphragm module unit has its control chamber connected to said fourth nozzle, its flow chamber connected to the nozzle of said second diaphragm module unit, its nozzle connected to atmosphere, and its spring located within its flow chamber for applying a bias force to its diaphragm against the output pressure in its control chamber from the thermostat.

6. The subbase of claim 5 wherein said restriction is connected between said first and second nozzles.

* * * * *